US012493074B2

(12) United States Patent
B et al.

(10) Patent No.: US 12,493,074 B2
(45) Date of Patent: Dec. 9, 2025

(54) TEST MODE FOR GLITCH DETECTION AND BIT MISS IN A DIGITAL ISOLATOR

(71) Applicant: TEXAS INSTRUMENTS INCORPORATED, Dallas, TX (US)

(72) Inventors: Krishnanunni B, Bangalore (IN);
Pratishthit Iyer, Bangalore (IN);
Kumar Anurag Shrivastava, Bangalore (IN); Rahul Prakash, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/609,985

(22) Filed: Mar. 19, 2024

(65) Prior Publication Data
US 2025/0298080 A1 Sep. 25, 2025

(51) Int. Cl.
*G01R 31/3177* (2006.01)
*H03K 3/037* (2006.01)
*H03K 19/20* (2006.01)

(52) U.S. Cl.
CPC ......... *G01R 31/3177* (2013.01); *H03K 3/037* (2013.01); *H03K 19/20* (2013.01)

(58) Field of Classification Search
CPC .................................................. G01R 31/3177
See application file for complete search history.

(56) References Cited

U.S. PATENT DOCUMENTS

2020/0279602 A1* 9/2020 Nasum ............. G11C 11/40615
2024/0291696 A1* 8/2024 Shrivastava ........ H04L 25/0266
2024/0305274 A1* 9/2024 Shrivastava ........... H03K 19/21

* cited by examiner

Primary Examiner — Patrick O Neill
(74) Attorney, Agent, or Firm — Mandy Barsilai Fernandez; Frank D. Cimino

(57) ABSTRACT

An apparatus includes a transmitter, a voltage regulator, an isolator, and a test controller. The transmitter has an input, an output, and a first supply voltage terminal. The input couples to the apparatus' input terminal. The voltage regulator's input couples to a second supply voltage terminal. The voltage regulator's output couples to the first supply terminal. The first terminal of the isolator couples to the output of the transmitter. A first test controller terminal couples to the second supply voltage terminal. A second test controller terminal couples to the input terminal of the apparatus. The first control output couples to the control input of the voltage regulator. The test controller changes a logic state of a control signal at the first control output from a first logic state to a second logic state.

21 Claims, 11 Drawing Sheets

TEST MODE FOR GLITCH DETECTION AND BIT MISS IN A DIGITAL ISOLATOR

BACKGROUND

A digital isolator includes a transmitter and receiver separated by an isolation barrier (isolator). Digital data received into the transmitter is then transmitted through the isolator to the receiver. The digital data output from the digital isolator should match the digital data received at the input to the digital isolator. Unfortunately, the drive strength of the transmitter may be reduced at higher data rates. Further, the isolator is susceptible to noise. And parameters associated with components within the receiver may be substantially above or below their nominal values. Such transmitter, isolator, and receiver issues can contribute to missed bits and/or glitches in the output data from the digital isolator. A glitch is a short-duration signal pulse present in the output data that was not present (nor intended to be present) in the input data.

SUMMARY

In one example, an apparatus includes a transmitter, a voltage regulator, an isolator, and a test controller. The transmitter has an input, an output, and a first supply voltage terminal. The input couples to the apparatus' input terminal. The voltage regulator's input couples to a second supply voltage terminal. The voltage regulator's output couples to the first supply terminal. The first terminal of an isolator couples to the output of the transmitter. A first test controller terminal couples to the second supply voltage terminal. A second test controller terminal couples to the input terminal of the apparatus. The first control output couples to the control input of the voltage regulator. The test controller changes a logic state of a control signal at the first control output from a first logic state to a second logic state.

In another example, an apparatus includes an isolator having a first terminal and a second terminal. A receiver has an input and an output. The input of the receiver is coupled to the first terminal of the isolator. A buffer has an input coupled to the output of the receiver. A glitch detection circuit has an input coupled to the output of the receiver.

In yet another example, an apparatus includes a voltage regulator having input voltage, an output voltage terminal, and a control input. A transmitter has an input, an output, and an input voltage terminal. The input voltage terminal is coupled to the output voltage terminal of the voltage regulator. An isolator has a first terminal, a second terminal, a third terminal, and a fourth terminal. The first terminal of the isolator is coupled to the output of the transmitter. A receiver has an input and an output. The input of the receiver is coupled to the second terminal of the isolator. A glitch detection circuit has an input and a control input. The input of the glitch detection circuit is coupled to the output of the receiver. The control input of the glitch detection circuit is coupled to the fourth terminal of the isolator. A test controller has a first test controller terminal and a second test controller terminal. The first test controller terminal is coupled to the control input of the voltage regulator. The second test controller terminal is coupled to the third terminal of the isolator.

DETAILED DESCRIPTION

Figure 1:
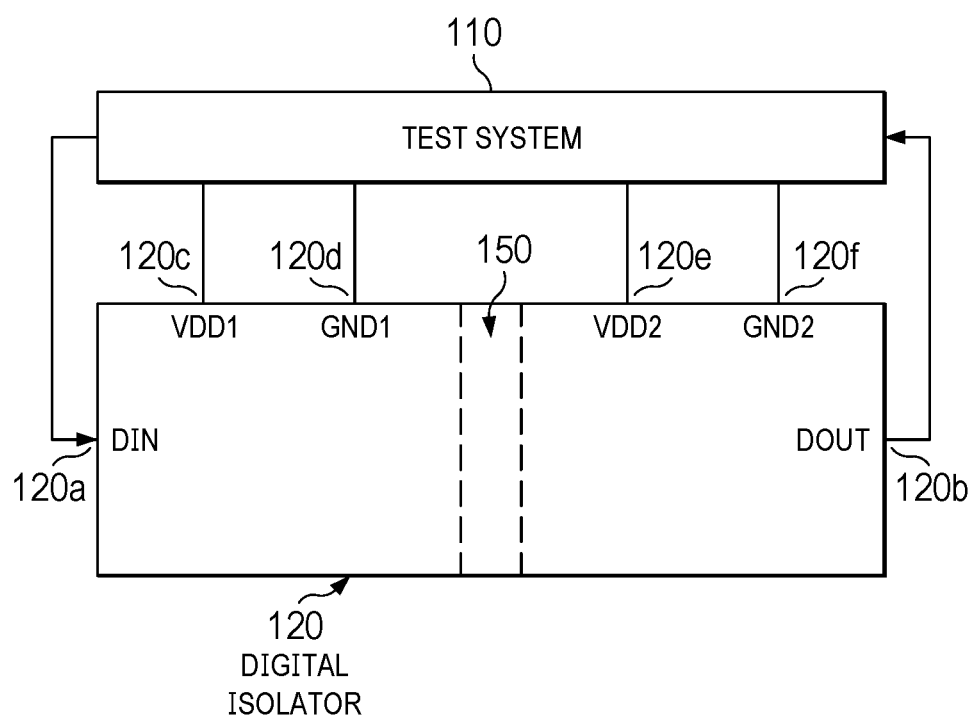
FIG. 1 is a system diagram in which a tester is coupled to a digital isolator to test the digital isolator for missed bits and/or glitches in its output data, in an example.

The same reference numbers or other reference designators are used in the drawings to designate the same or similar (either by function and/or structure) features.

One or more tests may be performed on a digital isolator to verify its operation. The digital isolator may be coupled to an external test system to perform such tests. In one example, a missed bit test may be performed in which test data is provided to an input of the digital isolator, and the output data from the digital isolator is compared to the input test data to determine whether any of the bits of the test data failed to successfully pass through the digital isolator. The output voltage from a voltage regulator within the digital isolator that provides power to the transmitter may experience a transient reduction when data at relatively high speeds is provided to the digital isolator. The drop in voltage to the transmitter resulting from high-speed data reduces the drive strength of the transmitter thereby making the digital isolator more susceptible to missed bits. A high bandwidth test system can be used to cause the voltage regulator's drop in output voltage to test the digital isolator for a missed bit in a worst-case scenario.

In another example, a glitch detection test can be performed by the test system. In a glitch detection test, the test system analyzes the output data from the digital isolator to detect the presence of any glitches. Due to the relatively narrow pulse width of such glitches, a high bandwidth test system can be used to perform the test. In one example, a high bandwidth test system can provide 10 Mbps test data to/from the digital isolator.

High bandwidth test systems, however, can be very costly. The examples described herein pertain to a digital isolator capable of entering a test mode that forces the transmitter's voltage regulator to reduce its output voltage for the duration of a missed bit test. Low speed test data can then be provided by a low bandwidth, and less expensive, test system with the transmitter in a low drive strength condition. Further, the described digital isolator includes a glitch detection circuit that detects glitches in its data. During the glitch detection test, the output data from the digital isolator matches the input data until the digital isolator's glitch detection circuit detects a glitch. The glitch detection circuit responds to a detection of a glitch by forcing its output data to a static logic level (e.g., logic high). The external test system determines that a data glitch has occurred within the digital isolator in response to the output of the digital isolator being at the static logic level. Accordingly, the test system itself need not detect high-speed glitches, and a low bandwidth (e.g., inexpensive) test system can be used for the glitch detection test.

FIG. 1 is a diagram of a digital isolator 120 coupled to a test system 110. In an example, test system 110 is a low bandwidth (e.g., 1 Mbps or less) test system. Digital isolator 120 includes an input 120a, an output 120b, a first supply voltage terminal 120c (to receive a ground voltage VDD1), a first ground terminal 120d (at a first ground level GND1), a second supply voltage terminal 120e (to receive a supply voltage VDD2), and a second ground terminal 120f (at a second ground level GND2). Supply voltage VDD1 provides power to a circuit on one side of an isolation barrier (isolator) 150, and supply voltage VDD2 provides power to a circuit on the other side of isolator 150. Test system 110 provides input data signal DIN (e.g., test data) to input 120a of digital isolator 120 and receives output data signal DOUT from output 120b. Test system 110 provides voltages and grounds VDD1, GND1, VDD2, and GND2 to the corresponding terminals 120c-120f of digital isolator 120. Voltage VDD1 may be any voltage within a defined range, e.g., 10V to 20V. Similarly, voltage VDD2 may any voltage within a defined range.

To initiate the missed bit and glitch detection tests, test system 110 provides a particular test sequencing of voltage VDD1 and a particular test sequencing of the input data signal DIN—for example sequences that are not likely to occur during normal (non-test mode) operation of the digital isolator. For example, test system 110 provides voltage VDD1 having a saw-tooth waveform between a particular lower voltage and a particular higher voltage over a particular time period. The particular sequencing of the input data signal DIN may be a test bit pattern of data that would normally not occur. A test controller (FIG. 2) within digital isolator 120 determines whether the voltage VDD1 and input data match the particular sequences and initiates a test mode to perform the missed bit and glitch detection tests.

Figure 2:
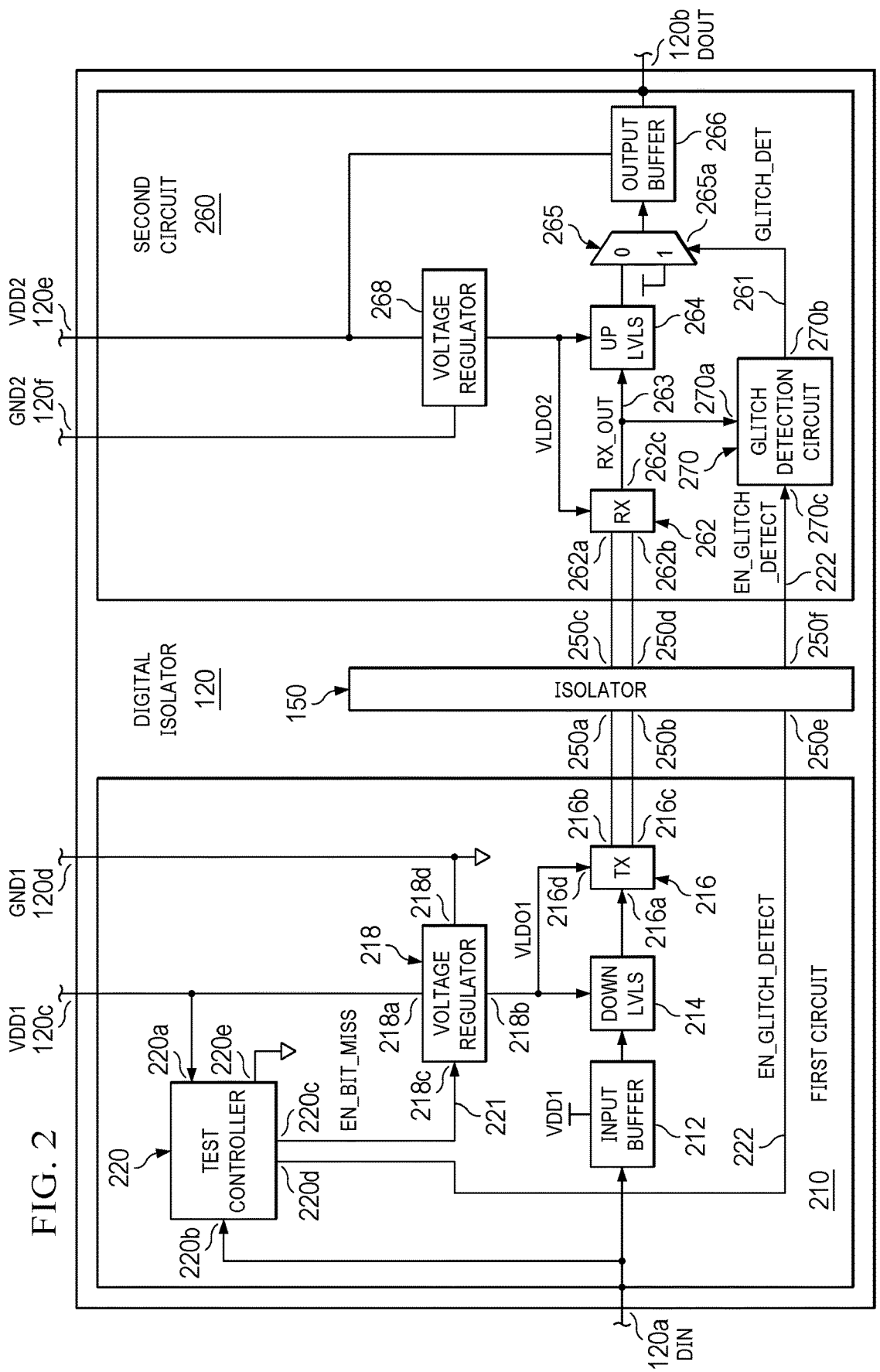
FIG. 2 is a block diagram of the digital isolator of FIG. 1 including voltage regulators, a transmitter, a receiver, and a glitch detection circuit, in an example.

FIG. 2 is a block diagram of digital isolator 120, in an example. Digital isolator 120 includes a first circuit 210, isolator 150, and a second circuit 260. Digital isolator 120 may be fabricated as an integrated circuit (IC).

Isolator 150 has terminals 250a, 250b, 250c, 250d, 250e, and 250f. Terminals 250a, 250b, and 250e are coupled to first circuit 210, and terminals 250c, 250d, and 250f are coupled to second circuit 260. Isolator 150 provides galvanic isolation between first circuit 210 and second circuit 260. In one example, isolator 150 includes capacitors to provide isolation between the first and second circuits. In another example, isolator 150 includes transformers to provide the isolation.

First circuit 210 includes an input buffer 212, a down level shifter (LVLS) 214, a transmitter 216, a voltage regulator 218, and a test controller 220. Input buffer 212 has an input coupled to input 120a of digital isolator 120. An output of input buffer 212 is coupled to an input of down LVLS 214, and an output of LVLS 214 is coupled to an input 216a of transmitter 216. A differential output of transmitter 216 (outputs 216b and 216c) are coupled to terminals 250a and 250b of isolator 150. Transmitter 216 also has a supply voltage terminal 216d.

In some examples, voltage regulator 218 is a low drop-out (LDO) voltage regulator and provides an output voltage VLDO1. Voltage regulator 218 has an input 218a, an output 218b, a control input 218c, and a ground terminal 218d. Input 218a and ground terminal 218d are coupled to the respective first voltage supply terminal 120c and first ground terminal 120d of digital isolator 120. Output 218b of voltage regulator 218 is coupled to the supply voltage terminal 216d of transmitter 216 and to the input of down LVLS 214. Down LVLS 214 downconverts the input data from input buffer 212 from the VDD1 power domain to the output voltage VLDO1 of voltage regulator 218.

Test controller 220 includes test controller terminals 220a and 220b and control outputs 220c and 220d. Test controller terminal 220a is coupled to the first voltage supply terminal 120c. Test controller terminal 220b is coupled to the input 120a of digital isolator 120. Control output 220c is coupled to the control input 218c of voltage regulator 218. Control output 220d is coupled to terminal 250e of isolator 150. During a test mode, test controller 220 generates signals EN_BIT_MISS 221 and EN_GLITCH_DET 222 at the respective control outputs 220c and 220d.

Second circuit 260 includes a receiver 262, an up LVLS 264, a multiplexer 265, an output buffer 266, a voltage regulator 268 (e.g., an LDO voltage regulator), and a glitch detection circuit 270. Receiver 262 has a differential input 262a/262b and an output 262c. Output 262c is coupled to an input of up LVLS 264. Receiver 262 generates a signal RX_OUT 263 at output 262c. The output 262b of up LVLS 264 is coupled to the "0" input of multiplexer 265. Glitch detection circuit 270 has an input 270a, an output 270b, and a control input 270c. Input 270a of glitch detection circuit 270 is coupled to output 262c of receiver 262 and receives output signal RX_OUT 263. Output 270b of glitch detection circuit 270 is coupled to a selection input 265a of multiplexer 265. Glitch detection circuit's control input 270c is coupled to terminal 250f of isolator 150. Glitch detection circuit 270 generates signal GLITCH_DET 261 at output 270b. Signal GLITCH_DET 261 is the selection signal for multiplexer 265. The "1" input of multiplexer 265 receives a logic high ("1") signal. The output of multiplexer 265 is coupled to an input of output buffer 266. The output of output buffer 266 is coupled to output 120b of digital isolator 120.

Voltage regulator 268 has terminals coupled to second supply voltage terminal 120e and second ground terminal 120f. Voltage regulator 268 provides a voltage VLDO2 to receiver 262 and up LVLS 264. Output buffer 266 receives supply voltage VDD2 as its operating voltage. Up LVLS 264 shifts the digital output signal from receiver 262 to the voltage domain of voltage VDD2.

During run-time operation (not a test mode), digital isolator 120 receives input data signal DIN at its input 120a. The input data signal DIN may include serial digital data. Input buffer 212 receives and stores the digital data and then provides each bit of the digital data to the down LVLS 214. Down LVSL 214 level-shifts the voltage of the input data to a level consistent with the power domain of transmitter 216 (voltage VLDO1). Transmitter 216 transfers the bits of the digital data through isolator 150 to receiver 262. Receiver 262 provides the received bits from isolator 150 to up LVLS 264, which level-shifts the received bits to the power domain of the output buffer 266 (voltage VDD2). During run-time operation, the operation of glitch detection circuit 270 is disabled by test controller 220 asserting signal EN_GLITCH_DET 222 to a logic low level. In response to a logic low for signal EN_GLITCH_DET 22, glitch detection circuit 270 causes its output signal, GLITCH_DET 261, to be at a logic low level. With signal GLITCH_DET 261 being logic low, the 0-input of multiplexer 265 is selected, which causes the bits received by receiver 262 to pass through multiplexer 265 to output buffer 266. Output buffer 266 then provides the data through output 120b.

Figure 3:
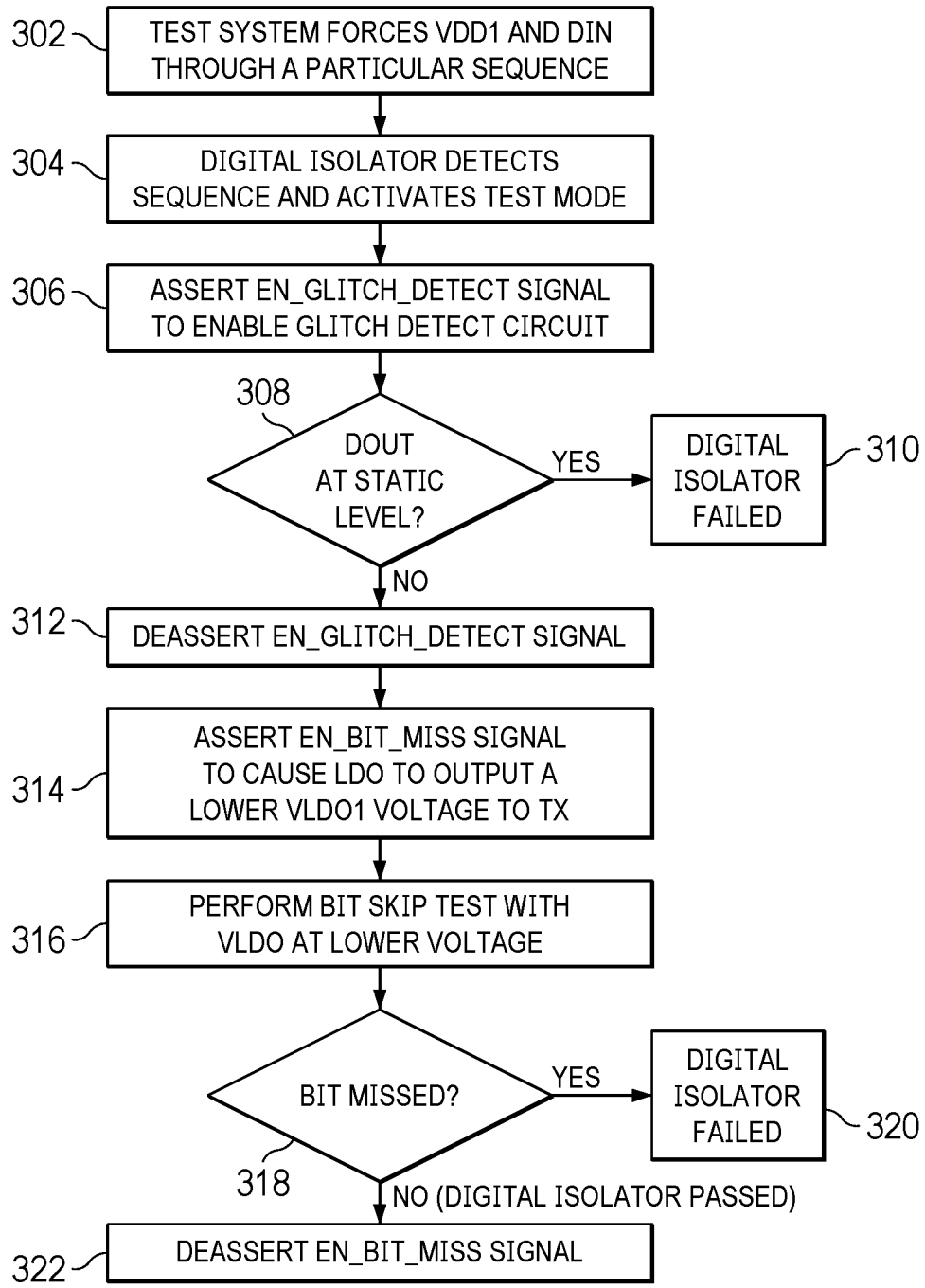
FIG. 3 is a flow diagram illustrating testing the digital isolator for output data glitches and for missed bits, in an example.

FIG. 3 is a flow diagram illustrating an example test process for digital isolator 120. The operations of FIG. 3 can be performed in the order shown, or in a different order. Referring to FIGS. 2 and 3, at operation 302, test system 110 forces voltage VDD1 and data DIN to the digital isolator through a particular test sequence, as described above, to initiate a test of digital isolator 120. The particular sequencing of voltage VDD1 and data DIN would normally not occur during non-test operations of the digital isolator.

At 304, digital isolator 120 detects the occurrence of the particular test sequencing of voltage VDD1 and test input data signal DIN and activates its test mode. The test controller 220 may detect the sequencing of voltage VDD1 and input data signal DIN by determining that the received sequencing of voltage VDD1 and input data signal DIN matches a stored test sequencing of voltage VDD1 and test bit pattern. During the test mode, at operation 306 test controller 220 asserts signal EN_GLITCH_DET 223 to a logic level (e.g., logic high) to enable (e.g., start operation of) glitch detection circuit 270. Test controller 220 enables glitch detection circuit 270 for a period of time (e.g., 1 ms). During that period of time, test system 110 provides the input data signal DIN to the digital isolator 120. Glitch detection circuit 270 determines whether the data at the output of receiver 262 has any glitches. Upon detecting a glitch, glitch detection circuit 270 asserts signal GLITCH_DET 261 to a logic high, responsive to which multiplexer 265 selects the "1" input thereby causing the multiplexer to output a logic 1 to output buffer 266. The output buffer 266 provides signal DOUT at a static logic level ("1"). At operation 308, test system 110 determines whether output data signal DOUT is at a static level (a fixed level despite the input test data DIN changing logic state). If output data signal DOUT is at a static level (the "Y" branch from operation 308), digital isolator 120 is deemed to have failed the test.

If, however, output data signal DOUT is not at a static level (the "N" branch") as detected by test controller 220, then at operation 312, test controller 220 desserts the signal EN_GLITCH_DETECT 222 (e.g., logic low) to disable (e.g., stop operation of) glitch detection circuit 270. In one example, the test controller may determine when a period of time has elapsed during which no glitches have been detected (e.g., 1 ms) and disables the glitch detection circuit. At operation 314, test controller 220 asserts signal EN_BIT_MISS 221 to the control input 218c of voltage regulator 218, responsive to which voltage regulator 218 provides a lower voltage VLDO1 to transmitter 216. With a lower supply voltage to transmitter 216, digital isolator 120 is tested to determine if any bits of input data signal DIN are missing from output data signal DOUT. For this test, input data DIN advantageously can be relatively low-speed data (e.g., less than 1 Mbps). Test controller 220 may maintain signal EN_BIT_MISS 221 for a long enough period of time (e.g., 1 ms) to allow sufficient time to detect any possible missed bits.

At operation 316, test system 110 performs the bit skip test with the transmitter voltage VLDO1 at a lower level. In one example, test system 110 provides test data (input data signal DIN) to the input 120a of digital isolator 120 and compares the output data signal DOUT to the input data to confirm that all bits of the input data are present in the output data. At decision operation 318, test system 110 determines if any bits are missing in the output data. If a bit is missing (the "Y" branch), then digital isolator 120 is deemed to have failed the test. If no bits are missing (the "N" branch) as determined by test controller 220, then digital isolator 120 is deemed to have passed both tests (glitch detection test and bit skip test)—test controller 220 determined that signal DOUT was not at the static level at operation 308 and that no bits were missing at operation 318. Responsively, at operation 322, test controller 220 deasserts the signal EN_BIT_MISS 221, and voltage regulator 218 increases its output voltage VLDO1 back to its original level. Test system 110 may perform additional tests on digital isolator 120.

Figure 4:
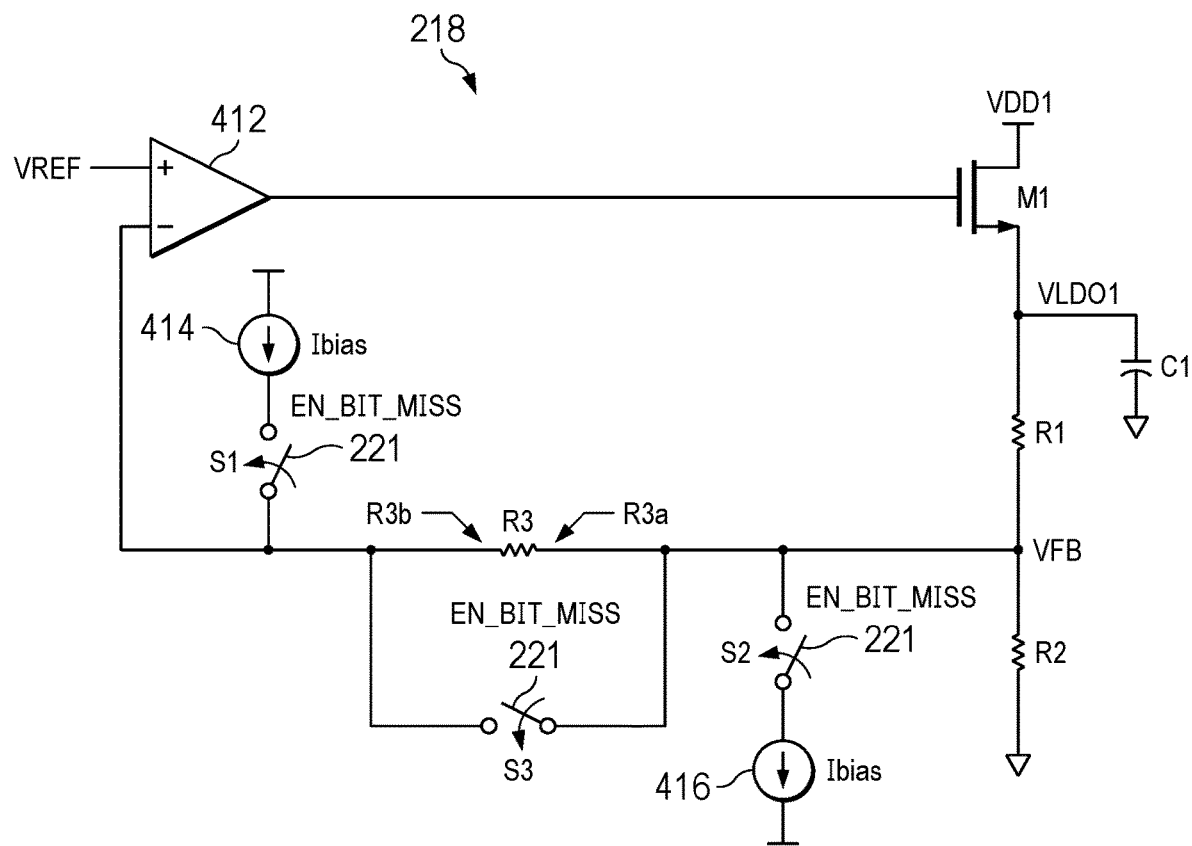
FIG. 4 is a circuit schematic of a voltage regulator for powering the transmitter of FIG. 2, in an example.

FIG. 4 is a schematic diagram of voltage regulator 218, in an example. Voltage regulator 218 is an LDO voltage regulator in this example. Voltage regulator 218 includes an operational amplifier (OP AMP) 412, a transistor M1, resistors R1, R2, and R3, a capacitor C1, switches S1, S2, and S3, and current source circuits 414 and 416. Switches S1-S3 may be transistors. Transistor M1 is an n-channel field effect transistor (NFET) whose drain is coupled to input 218a and receives the first supply voltage VDD1. Resistors R1 and R2 are coupled in series with resistor R1 coupled to the source of transistor M1, and resistor R2 is coupled to the ground terminal 218d (GND1). Resistors R1 and R2 form a voltage divider to divide down voltage VLDO1 to produce a feedback voltage VFB. Voltage VLDO1 is the voltage at the source of transistor M1. Terminal R3a of resistor R3 is coupled to the connection between resistors R1 and R2, and terminal R3b of resistor R3 is coupled to the negative (inverting) input of OP AMP 412. A reference voltage is provided to the positive (non-inverting) input of OP AMP 412. The terminals of switch S3 are coupled across resistor R3. When closed, switch S3 shorts resistor R3. Current source circuit 414 is coupled between a voltage source terminal (e.g., input 218) and a terminal of switch S1. The other terminal of switch S1 is coupled to terminal R3b of resistor R3. Current source circuit 416 is coupled between a ground terminal (e.g., ground terminal 218d) and a terminal of switch S2. The other terminal of switch S2 is coupled to terminal R3a of resistor R3. The current produced by each current source 414 and 416 may be the same current, Ibias.

Switches S1-S3 are controlled responsive to signal EN_BIT_MISS 221. When signal EN_BIT_MISS 221 is logic low, switch S3 closes and switches S1 and S2 open. In this configuration, feedback voltage VFB is provided through switch S3 to the negative input of OP AMP 412. The output voltage from OP AMP 412 is a voltage provided to the gate of transistor M1, which controls the drain current through transistor M1. The drain current through transistor M1 is such that feedback voltage VFB is approximately equal to VREF. Voltage VLDO1 is:

$$VLDO1 = K * VREF \text{ where } K = \left(1 + \frac{R2}{R1}\right).\quad\text{(Eq. 1)}$$

When signal EN_BIT_MISS 221 is logic high, switch S3 opens and switches S1 and S2 close, thereby allowing current Ibias to flow through resistor R3. In this configuration, voltage VLDO1 is:

$$VLDO1=(K*VREF)-(K*I\text{bias}*R3)\quad\text{(Eq. 2)}$$

Accordingly, when signal EN_BIT_MISS 221 is logic high, the output voltage from voltage regulator 218 is lower than when signal EN_BIT_MISS 221 is logic low. The resistance of resistor R3 and the current Ibias can be selected such that the drop in voltage of VLDO1 when EN_BIT_MISS 221 is logic high compared to when EN_BIT_MISS 221 is logic low emulates the drop in voltage that would occur when high speed data DIN is provided to the digital comparator 120.

Figure 5:
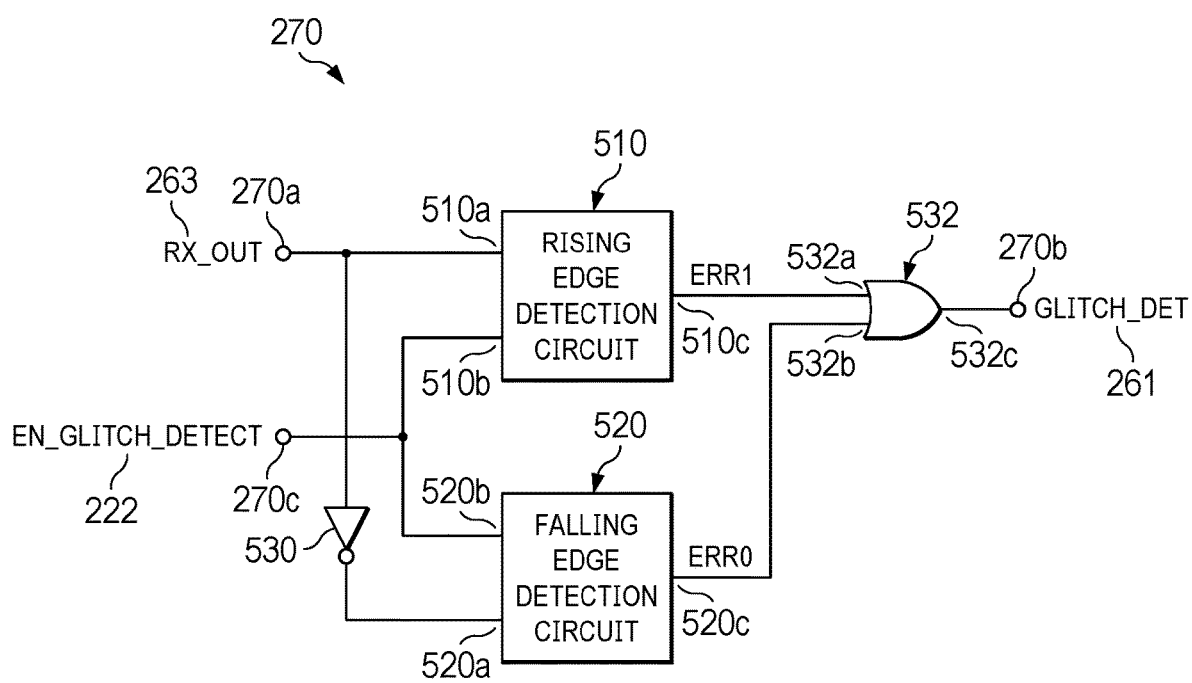
FIG. 5 is a block diagram of the glitch detection circuit including rising and falling edge glitch detection circuits, in an example.

FIG. 5 is a block diagram of glitch detection circuit 270, in an example. Glitch detection circuit 270 includes an inverter 530, an OR gate 532, a rising edge detection circuit 510, and a falling edge detection circuit 520. Rising edge detection circuit 510 has inputs 510a and 510b and an output 510c. Falling edge detection circuit 520 has inputs 520a and 520b and an output 520c. Input 270a of glitch detection circuit 270 is coupled to input 510a of rising edge detection circuit 510 and to an input of inverter 530. The output of inverter 530 is coupled to input 520a of falling edge detection circuit 520. Accordingly, input 270a of glitch detection circuit 270 is coupled to input 520a of falling edge detection circuit 520 through inverter 530. The control input 270c of glitch detection circuit 270 is coupled to inputs 510b and 520b of the respective rising edge detection circuit 510 and falling edge detection circuit 520.

OR gate 532 has inputs 532a and 532b and an output 532c. Output 510c of rising edge detection circuit 510 is coupled to input 532a of OR gate 532. Output 520c of falling edge detection circuit 520 is coupled to input 532b of OR gate 532. Rising edge detection circuit 510 generates a signal ERR1 at its output 510c. Falling edge detection circuit 520 generates a signal ERR0 at its output 520c. OR gate 532 logically OR's together signals ERR1 and ERR0 to produce the signal GLITCH_DET 261 at its output 532c.

Rising edge detection circuit 510 generates a signal pulse in response to a rising edge of an input signal, signal RX_OUT 263, at the input 270a of glitch detection circuit 270. The width of the signal pulse is such that signal RX_OUT 263 should not change logic state during the signal pulse. Rising edge detection circuit 510 determines whether signal RX_OUT 263 changes logic state during the signal pulse. A change in signal RX_OUT 263 during the signal pulse indicates the presence of a signal glitch. If signal RX_OUT 263 changes logic state during the signal pulse, rising edge detection circuit 510 asserts signal ERR1 to a logic high state to indicate the presence of a signal glitch. Otherwise, rising edge detection circuit 510 generates signal ERR1 at a low logic state to indicate the absence of a signal glitch.

Falling edge detection circuit 520 performs a similar function but for a falling edge of signal RX_OUT 263. Falling edge detection circuit 520 generates a signal pulse (e.g., same width as the signal pulse generated by rising edge detection circuit 510) in response to a falling edge of signal RX_OUT 263. Falling edge detection circuit 520 asserts signal ERR0 at a logic high state if signal RX_OUT 263 changes state during the signal pulse generated by the falling edge detection circuit (indicative of a signal glitch); otherwise, falling edge detection circuit 520 generates signal ERR0 at a logic low state (no signal glitch).

OR gate generates signal GLITCH_DET 261 at a logic high state if either or both of signals ERR0 or ERR1 are logic high. Accordingly, signal GLITCH_DET 261 is asserted high if a glitch is detected falling a rising edge of signal RX_OUT 263 and/or a falling edge of signal RX_OUT 263.

Figure 6:
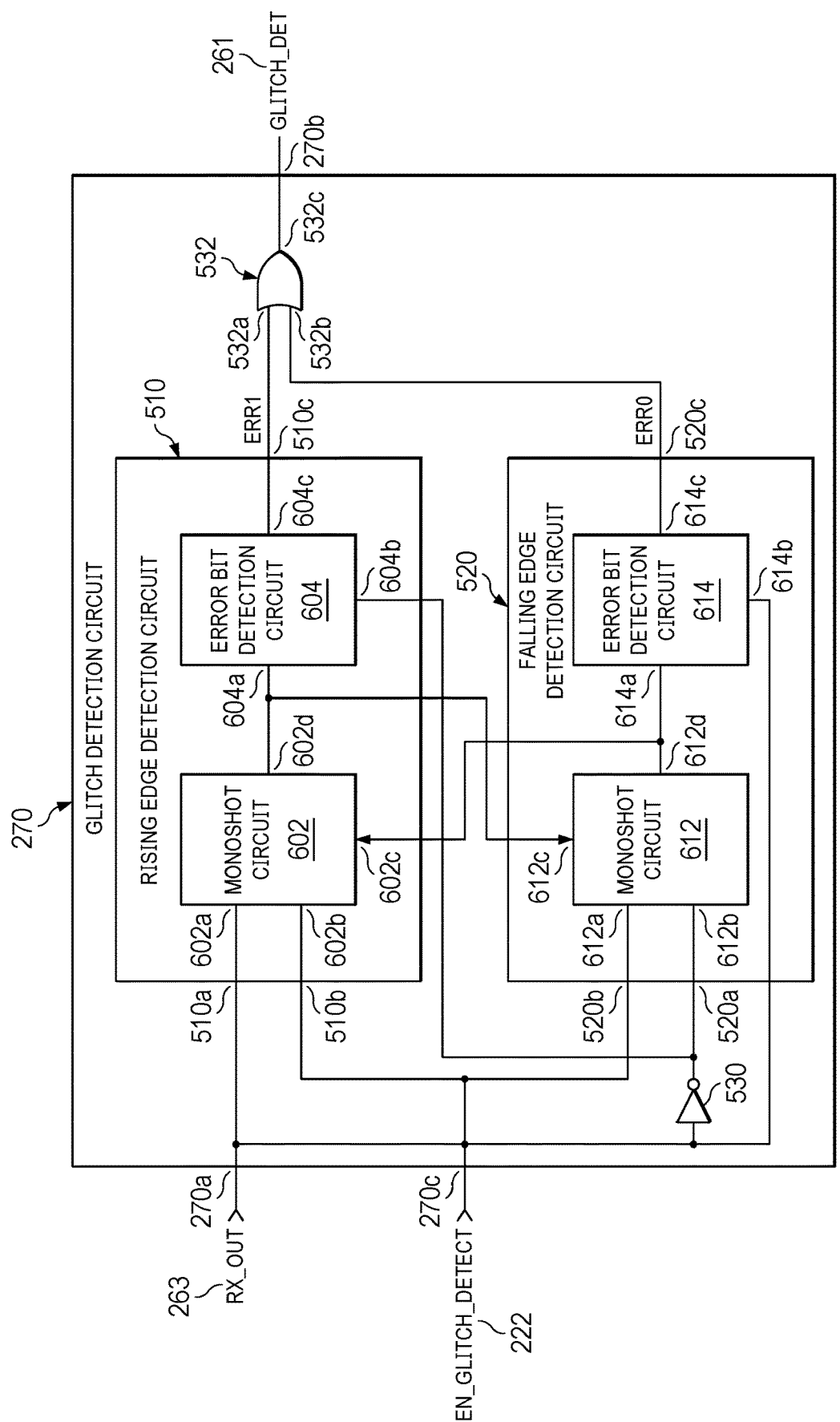
FIG. 6 is a block diagram of the glitch detection circuit of FIG. 5 in which each of the rising and falling edge glitch detection circuits include a monoshot circuit and an error bit detection circuit, in an example.

FIG. 6 is a block diagram of the glitch detection circuit 270 of FIG. 5 including additional detail regarding rising edge detection circuit 510 and falling edge detection circuit 520. In this example, rising edge detection circuit 510 includes a monoshot circuit 602 and an error bit detection circuit 604. Similarly, falling edge detection circuit 520 includes a monoshot circuit 612 and an error bit detection circuit 614. Monoshot circuit 620 has inputs 602a, 602b, and 602c and an output 602d. Input 602a is coupled to input 510a, and input 602b is coupled to input 510b. Error bit detection circuit 604 has inputs 604a and 604b and an output 604c. Input 604a is coupled to output 602d, and input 604b is coupled to the output of inverter 530. Output 604c of error bit detection circuit 604 is coupled to output 510c of rising edge detection circuit 510.

Monoshot circuit 612 has inputs 612a, 612b, and 612c and an output 612d. Input 612a is coupled to input 520a, and input 612b is coupled to input 520b. Error bit detection circuit 614 has inputs 614a and 614b and an output 614c. Input 614a is coupled to output 612d, and input 614b is coupled to input 270a of glitch detection circuit 270. Output 614c of error bit detection circuit 614 is coupled to output 520c of rising edge detection circuit 614. Output 612d of monoshot circuit 612 is coupled to input 602c of monoshot circuit 602. Output 602d of monoshot circuit 602 is coupled to input 612c of monoshot circuit 612.

Monoshot circuit 602 generates the signal pulse noted above in response to a rising edge of signal RX_OUT 263. Error bit detection circuit 604 determines whether signal RX_OUT 263 changes state during the signal pulse generated by monoshot circuit 602. Similarly, monoshot circuit 612 generates a signal pulse in response to a falling edge of signal RX_OUT 263. Error bit detection circuit 614 determines whether signal RX_OUT 263 changes state during the signal pulse generated by monoshot circuit 612.

Figure 7:
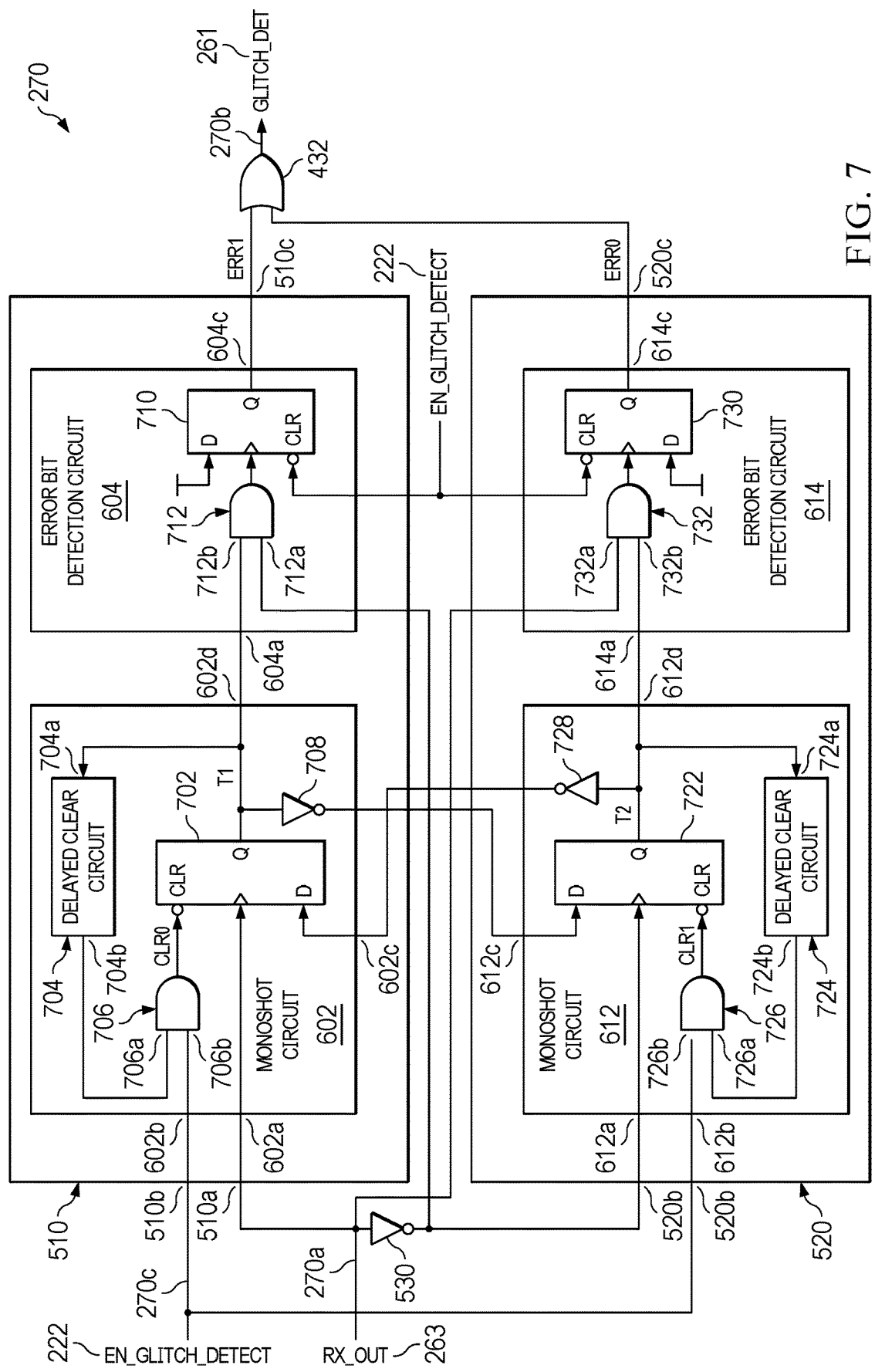
FIG. 7 is a circuit schematic of the monoshot and error bit detection circuits of FIG. 5, in an example.

FIG. 7 is a schematic diagram of the glitch detection circuit 270 of FIG. 6 illustrating example circuits for the monoshot circuits 602 and 612 and the error bit detection circuits 604 and 614. Monoshot circuit 602 includes a D flip-flop (DFF) 702, a delayed clear circuit 704, an AND gate 706, and an inverter 708. Error bit detection circuit 604 includes a DFF 710 and an AND gate 712. Monoshot circuit 612 includes a DFF 722, a delayed clear circuit 724, an AND gate 726, and an inverter 728. Error bit detection circuit 614 includes a DFF 730 and an AND gate 732.

DFF 702 has data (D) input, a clock input, a clear (Clr) input and a Q output. Delayed clear circuit 704 has an input 704a and an output 704b. AND gate 706 has inputs 706a and 706b and an output. The Q output of DFF 702 is coupled to input 704a of delayed clear circuit 704, and the output 704b of delayed clear circuit 704 is coupled to input 706a of AND gate 706. Input 706b of AND gate 706 is coupled to input 602b of monoshot circuit 602. The output of AND gate 706 is coupled to the clear input of DFF 702. AND gate 706 generates a signal CLR0 at its output. The clear input of DFF 702 is an active low input-DFF 702 is cleared forcing the signal T1 at its Q output to a logic low when the signal CLR0 is logic low. The D input of DFF 702 is coupled to input 602c of monoshot circuit 602. The Q output of DFF 702 is also coupled to an input of inverter 708 and to output 602d of monoshot circuit 602. The output of inverter 708 is coupled to input 612c of monoshot circuit 612.

Within the error bit detection circuit 604, AND gate 712 has inputs 712a and 712b and an output. Input 712a is coupled to the output of inverter 530 and receives the logical inverse of signal RX_OUT 263. Input 712b of AND gate 712 is coupled to input 604a of error bit detection circuit 604. The output of AND gate 712 is coupled to the clock input (e.g., active low input) of DFF 710. The D input of DFF 710 receives a logic high ("1") signal. The clear input of DFF 710 is coupled to input 270c of glitch detection circuit 270 and receives signal EN_GLITCH_DET 263. The Q output of DFF 710 is coupled to output 604c of error bit detection circuit 604.

Within monoshot circuit 612, delayed clear circuit 724 has an input 724a and an output 724b. AND gate 726 has inputs 726a and 726b and an output. The Q output of DFF 722 is coupled to input 724a of delayed clear circuit 204, and the output 724b of delayed clear circuit 724 is coupled to input 726a of AND gate 726. Input 726b of AND gate 726 is coupled to input 612b of monoshot circuit 612. The output of AND gate 726 is coupled to the clear input of DFF 722. AND gate 726 generates a signal CLR1 at its output. The clear input of DFF 722 is an active low input. The D input of DFF 722 is coupled to input 612c of monoshot circuit 612. The Q output of DFF 722 is also coupled to an input of inverter 728 and to output 612d of monoshot circuit 612. The output signal from DFF 722 is signal T2. The output of inverter 728 is coupled to input 602c of monoshot circuit 602.

Within the error bit detection circuit 614, AND gate 732 has inputs 732a and 732b and an output. Input 732a is coupled to input 270a of glitch detection circuit 270, and input 732b is coupled to input 614a of error bit detection circuit 614. The output of AND gate 732 is coupled to the clock input (e.g., active low) of DFF 730. The D input of DFF 730 receives a logic high ("1") signal. The clear input of DFF 730 is coupled to input 270c of glitch detection circuit 270 and receives signal EN_GLITCH_DET 263. The Q output of DFF 730 is coupled to output 614c of error bit detection circuit 614.

Figure 10:
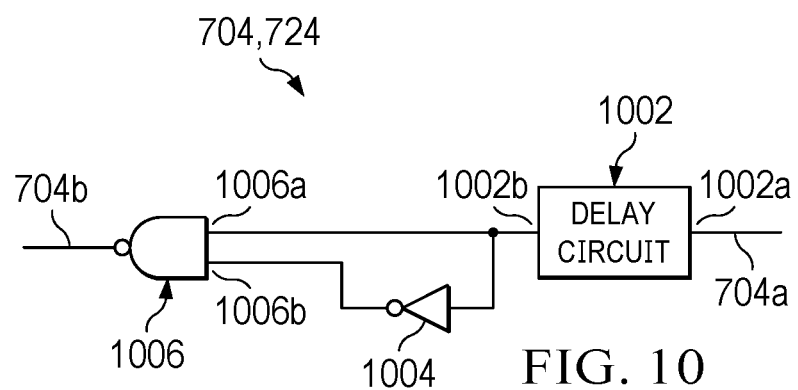
FIG. 10 is a circuit schematic of a delayed clear circuit included within each of the monoshot circuits of FIG. 7, in an example.

With signal T1 at a logic low state, the output signal from delayed clear circuit 704 is logic high. In response to and after a time delay following a rising edge of signal T1, delayed clear circuit 704 generates a negative pulse (logic low) at its output 704b to input 706a of AND gate 706. AND gate 706 responds to the negative pulse at its input 706a by forcing signal CLR0 logic low thereby clearing DFF 702. Delayed clear circuit 724 functions similarly. With signal T2 at a logic low state, the output signal from delayed clear circuit 724 is logic high. In response to and after a time delay following a rising edge of signal T2, delayed clear circuit 724 generates a negative pulse (logic low) at its output 724b to input 726a of AND gate 726. AND gate 726 responds to the negative pulse at its input 726a by forcing signal CLR1 logic low thereby clearing DFF 722. FIG. 10, described below, includes a circuit schematic of an example of each of the delayed clear circuits 704 and 724.

Figure 8:
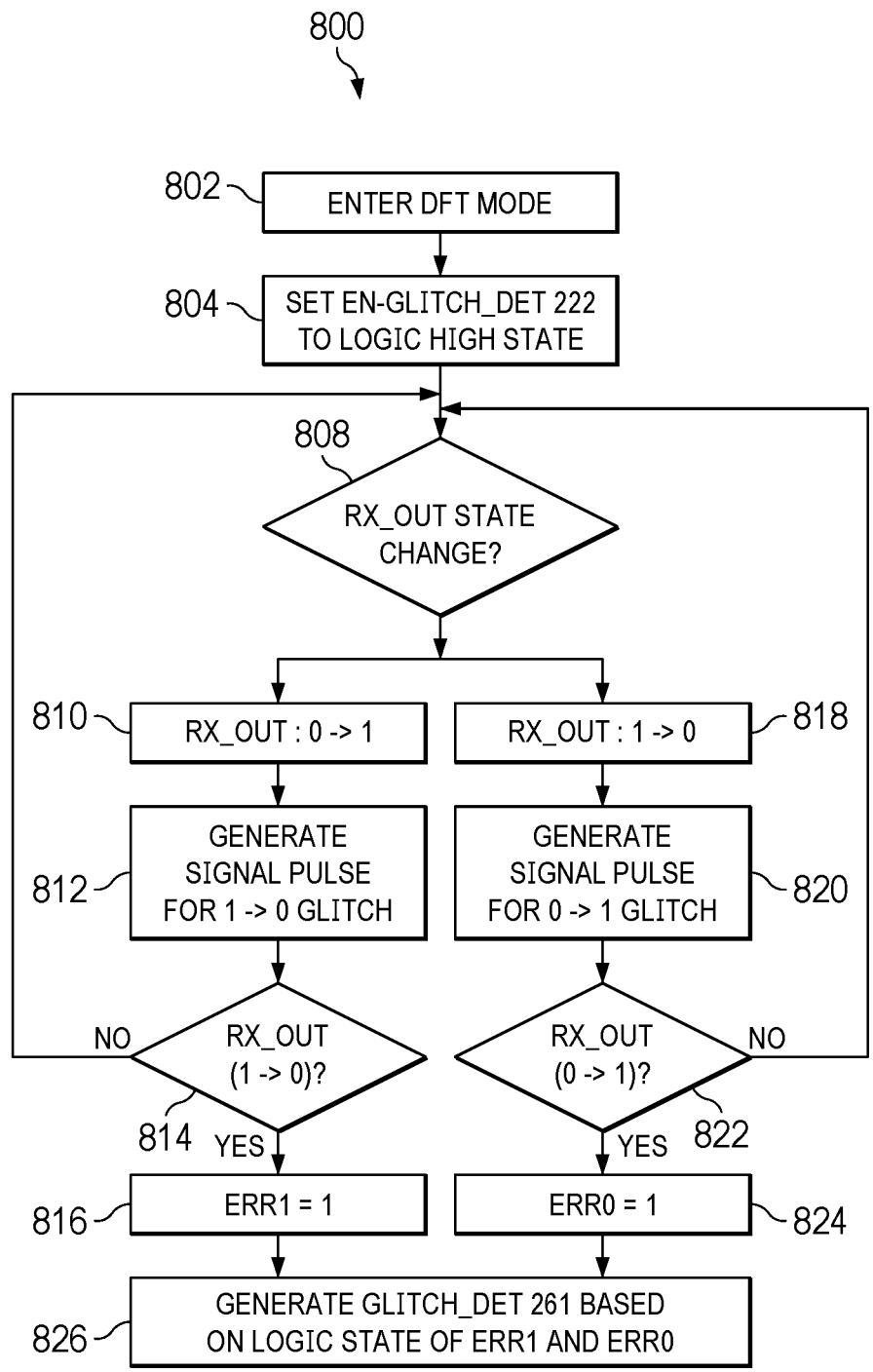
FIG. 8 is a timing diagram illustrating the operation of the glitch detection circuit, in an example.
Figure 9:
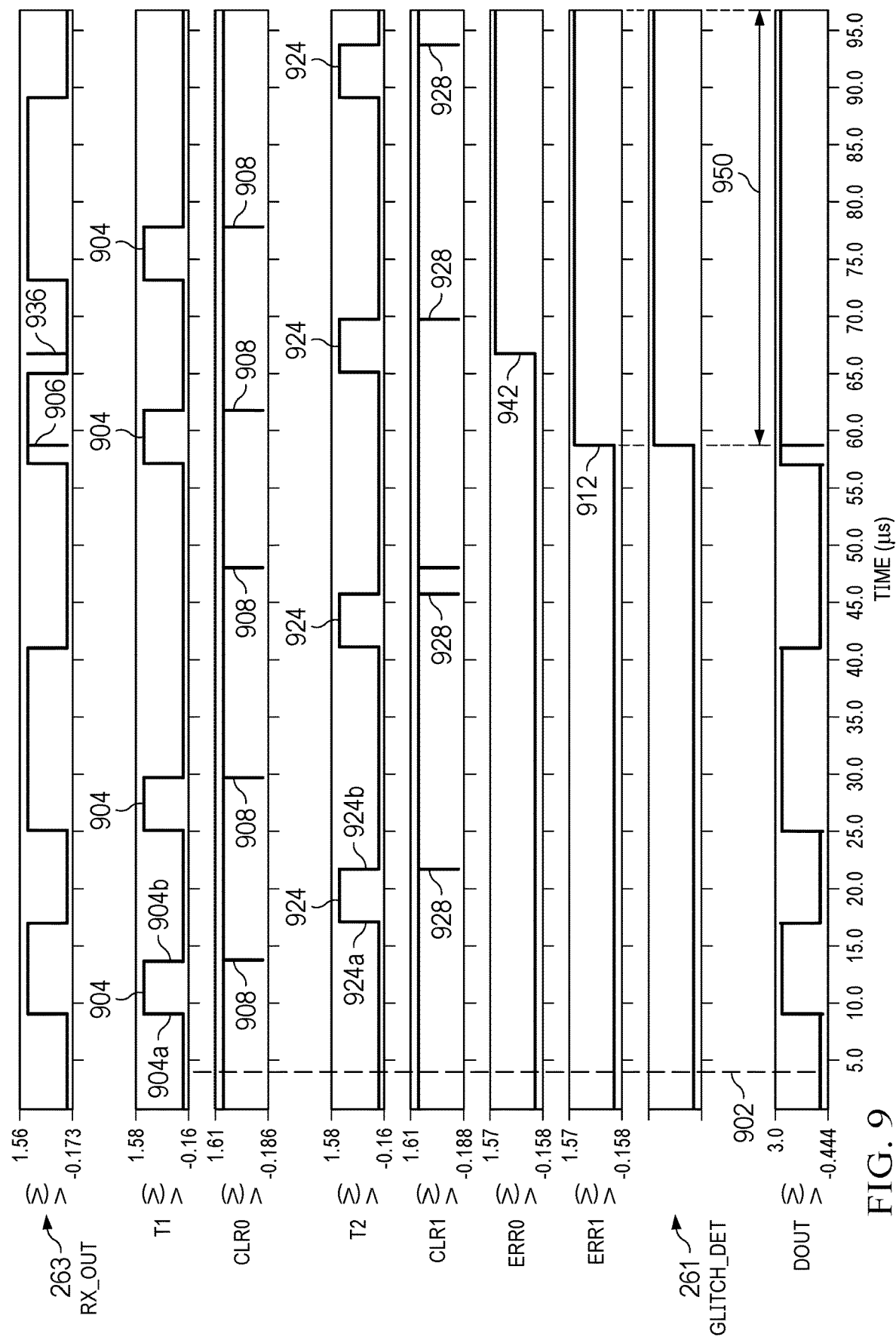
FIG. 9 are waveforms illustrating the operation of the glitch detection circuit, in an example.

FIG. 8 is a flow diagram 800 and FIG. 9 is a timing diagram illustrating the operation of the glitch detection circuit 270 of FIG. 7. FIG. 9 includes example waveforms for signals RX_OUT 263, T1, CLR0, T2, CLR1, ERR0, ERR1, GLITCH_DET 261, and output data signal DOUT.

Prior to the glitch detection circuit 270 performing a glitch detection test, test controller 220 forces signal EN_GLITCH_DET 222 to a logic low state. A logic low for signal EN_GLITCH_DET 222 to inputs 706b and 726b of the respective AND gates 706 and 726 (FIG. 7) forces DFFs 702 and 722 to be in a clear state. Accordingly, the output signals T1 and T2 from DFFs 702 and 722 are logic low. With signals T1 and T2 at logic low levels, the signals at the D inputs of DFFs 702 and 722 are logic high as a result of the inversion of signals T1 and T2 by inverters 708 and 728. With signals T1 and T2 at logic low levels, the output signals from delayed clear circuits 704 and 724 are logic high to inputs 706a and 726a of AND gates 706 and 726. DFFs 710 and 730 in the respective error bit detection circuits 604 and 624 are also in a clear state with signal EN_GLITCH_SET 222 at a logic low state, and their output signals ERR1 and ERR0 are logic low as indicated at time marker 902 in FIG. 9.

Referring to FIGS. 7, 8, and 9, at operation 802, test controller 220 enters a "design for test" (DFT) mode, for example, based on detection of a particular sequencing of voltage VDD1 and a particular sequencing of the input data signal DIN, as described above (e.g., with reference to operations 302 and 304 in FIG. 3). In response to entering the DFT mode, at operation 804, test controller 220 sets the signal EN_GLITCH_DET 222 to a logic high state to initiate the glitch detect test (as in operation 306 in FIG. 3). With signal EN_GLITCH_DET 222 at a logic high state, signals CLR0 and CLR1 to the clear inputs of DFFs 702 and 722 are logic high (as indicated at time marker 902) thereby releasing the DFFs from their clear states. Similarly, DFFs 710 and 730 are also released from their clear states in response to signal EN_GLITCH_DET 222 being logic high. As a result of DFFs 710 and 720 being in a clear state, signals ERR0 and ERR1 are logic low (also as indicated at time marker 902).

Upon a change in logic state of signal RX_OUT 263, control flows to operations 810-816 or to operations 818-824 depending on whether the change of logic state of signal RX_OUT 263 is a rising edge or a falling edge. If the change of logic state of signal RX_OUT is a rising edge (as indicated at operation 810), then at operation 812, a signal pulse 904 for signal T1 (also referred to as a sampling window) is generated. The width of signal pulse 904 is short enough that a change in logic state of signal RX_OUT 263 should not occur. Because signal RX_OUT 263 is at a logic high state, a falling edge of signal RX_OUT should not occur during signal pulse 904. In one example, the width of signal pulse 904 is 6 ns.

In the example of FIG. 7, the rising edge of signal RX_OUT 263 causes a rising edge 904a of pulse 904 to occur. Following a delay after rising edge 904a, delayed clear circuit 704 generates a negative pulse at its output 704b thereby, through AND gate 706, resulting in a negative pulse 908 for signal CLR0. The negative pulse 908 causes DFF 702 to be cleared thereby forcing signal T1 to become logic low (falling edge 904b) to complete signal pulse 904.

During signal pulse 904, the input 712b of AND gate 712 is logic high for the duration of the pulse. The input signal to input 712a of AND gate 712 is the output signal from inverter 530, which is the logical inverse of RX_OUT 263. In the present example in which signal RX_OUT 263 is logic high, the signal provided to the input 712a of AND gate is logic low, thereby preventing DFF 710 from being clocked when no glitch is present in signal RX_OUT 263. At decision operation 814, the "no" branch is taken due to the lack of signal glitch, and control loops back to operation 808.

However, a glitch may occur (the "yes" branch of operation 814) with signal RX_OUT 263 at a logic high state, and signal RX_OUT 263 may experience a short negative pulse 906. The short negative pulse 906 for signal RX_OUT 263 results in, due to inverter 530, a short positive pulse to the input 712a of AND gate 712. If the short positive pulse to input 712a occurs during signal pulse 904, then both inputs 712a and 712b are at a logic high state during the glitch, and the output signal to the clock input of DFF 710 will have a rising edge thereby clocking DFF 710. Because the D input of DFF 710 is logic high, signal ERR1 is forced to a logic high state, operation 816, as indicated by rising edge 912. At operation 826, signal GLITCH_DET 261 is generated responsive to signals ERR1 and ERR0. For example, OR gate 432 logically ORs signals ERR1 and ERR0 to produce signal GLITCH_DET 261.

Operations 818-824 are similar to operations 810-816 but are performed in response to a falling edge of signal RX_OUT 263. If a falling edge of signal RX_OUT 263 occurs (operation 818), then at operation 820, a signal pulse 924 is generated for signal T2. Through inverter 530, a falling edge of signal RX_OUT 263 causes DFF 722 to be clocked thereby generating a rising edge 924a for signal pulse 924 of signal T2. Following a delay produced by delayed clear circuit 724, the signal to input 726a of AND gate 726 has a short negative pulse, which causes signal CLR1 to have a short negative pulse 928 to the clear input of DFF 722. The negative pulse to the clear input of DFF 722 causes the DFF 722 to be cleared thereby terminating pulse 924 at falling edge 924b.

If no glitch is detected at decision operation 822, control loops back to operation 808. A glitch may be detected if signal RX_OUT 263 changes logic state (rising edge) during signal pulse 924. An example of such a glitch is glitch 936. During the glitch, the signals to inputs 732a and 732b of AND gate 732 are both logic high thereby causing DFF 730 to be clocked forcing signal ERR0 to a logic high state (942). If signal GLITCH_DET 261 was not already logic high, OR gate 432 forces signal GLITCH_DET 261 to a logic high state as a result of signal ERR0 being logic high.

As described above, signal GLITCH_DET 261 is the selection signal to multiplexer 265. Before a glitch is detected by glitch detection circuit 270 in signal RX_OUT 263, signal GLITCH_DET 261 is logic low thereby selecting the "0" input of multiplexer 265. With the "0" being selected, multiplexer 265 provides the up level-shifted version of signal RX_OUT 263 as output data signal DOUT. Upon the first of signals ERR1 and ERR0 to become logic high, GLITCH_DET 261 is forced high thereby selecting the "1" input of multiplexer 265. With the "1" input selected, multiplexer 265 provides a logic high thereby causing output data signal DOUT to be a static logic high as indicated at 950 in FIG. 9.

FIG. 10 is a circuit schematic of delayed clear circuit 704. The same circuit can be used to implement delayed clear circuit 724. Delayed clear circuit 704 includes a delay circuit 1002, an inverter 1004, and a NAND gate 1006. Delay circuit 1002 as an input 1002a and an output 1002b. NAND gate 1006 has inputs 1006a and 1006b and an output. Input 1002a is coupled to input 704a of delayed clear circuit 704. The output 1002b of delay circuit 1002 is coupled to an input of inverter 1004 and input 1006a of NAND gate 1006. The output of inverter 1004 is coupled to input 1006b of NAND gate 1006. The output of NAND gate 1006 is coupled to the output 704b of delayed clear circuit 704. The time delay implemented by delay circuit 1002 is the time duration of pulse 904 (or pulse 924 for delayed clear circuit 724).

When the input signal to delay circuit 1002 (e.g., signal T1) is a logic low, the signal at input 1006a of NAND gate 1006 is a logic low and the signal at input 1006b is logic high, thereby causing NAND gate 1006 to output a logic high signal at output 704b. In response to a rising of the signal at input 1002a, following the time delay implemented by delay circuit 1002, the signal to the input 1006a of NAND gate 1006 has a rising edge as well. The signal at input 1006b remains at a logic high level until the rising edge at the input of inverter 1004 propagates through inverter 1004. Accordingly, for the duration of the propagation of inverter 1004, the output signal from NAND gate 1006 is logic low. Following the propagation delay of inverter 1004, both inputs 1006a and 1006b are at opposite logic states (logic high for input 1006a and logic low for input 1006b), and NAND gate 1006 provides an output signal at a logic high state.

Figure 11:
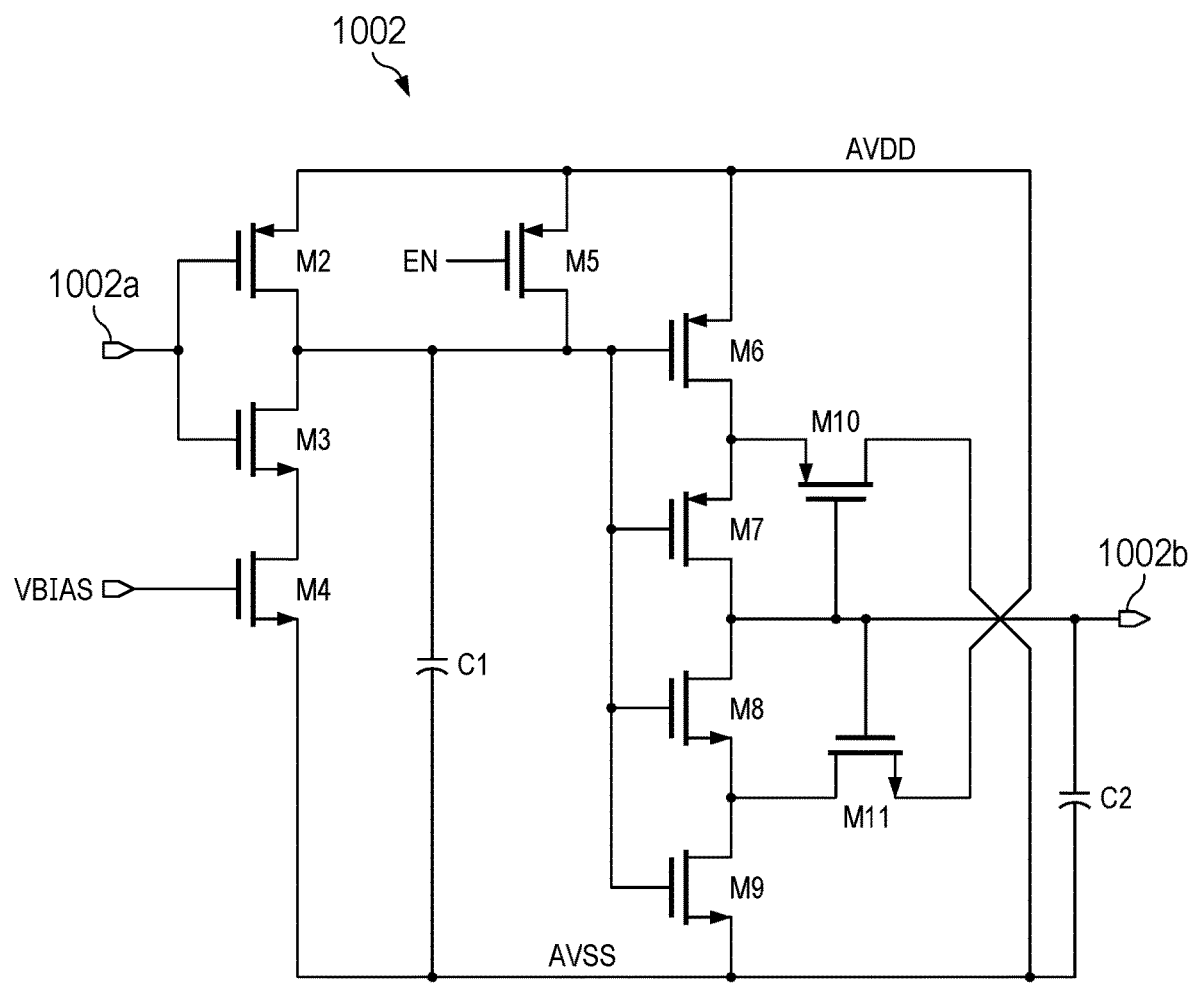
FIG. 11 is circuit schematic of a delay circuit usable in the delayed clear circuit of FIG. 10, in an example.

FIG. 11 is a circuit schematic of delay circuit 1002 from FIG. 10. Delay circuit 1002 includes transistors M2, M3, M4, M5, M6, M7, M8, M9, M10, and M11 and capacitors C1 and C2. In this example, transistors M2, M5-M7, and M10 are p-channel field effect transistors (PFETs) and transistors M3, M4, M8, M9, and M11 are NFETs. The gates of transistors M2 and M3 are coupled to input 1002a of delay circuit 1002. The sources of transistors M4, M5 and M11 are coupled to a supply voltage terminal (AVDD). The sources of transistors M4 and M9 and the drain of transistor M10 are coupled to a ground terminal (AVSS). The drains of transistors M2 and M3 are coupled together. The source of transistor M3 is coupled to the drain of transistor M4. Capacitor C1 is coupled between the drains of transistors M2 and M3 and ground terminal AVSS. The drain of transistor M5 is coupled to the drains of transistors M2 and M3 and to the gates of transistors M6-M9. The drain of transistor M6 is coupled to the source of transistor M7 and to the source of transistor M10. The drains of transistors M7 and M8 are coupled together and to the gates of transistors M10 and M11 and to output 1002b. The source of transistor M8 is coupled to the drain of transistor M9 and to the drain of transistor M11. Transistors M6-M9 form a Schmitt trigger circuit. Capacitor C2 is coupled between the output 1002b and the ground terminal AVSS.

Transistor M5 can turn delay circuit 1002 on and off. An enable signal EN to the gate of transistor M5 turns the delay circuit on when the enable signal is logic low. Delay circuit 1002 turns off when the enable signal EN is logic high.

With the signal at input 1002a at a logic low level, transistor M2 turns on and current flows through transistor M2 to charge capacitor C1 to a logic high state. The voltage across capacitor C1 is applied to the gates of transistors M6-M9. With capacitor C1 charged to a logic high state, transistors M8 and M9 turn on thereby forcing the signal at output 1002b being a logic low.

When the signal to input 1002b has a rising edge, transistor M2 turns off and transistor M3 turns on. The gate of transistor M4 receives a bias voltage Vbias which turns transistor M4 on. With both transistors M3 and M4 on, capacitor C1 begins to discharge through transistors M3 and M4 to ground. The voltage across capacitor C1 ramps down at a rate that is a function of the discharge current level permitted by the gate-to-source voltage (Vgs) of transistor M4 and the capacitance of capacitor C1. Accordingly, the time delay implemented by delay circuit 1002 can be set by the selection of the Vgs of transistor M4 and the capacitance of capacitor C1. Eventually, the voltage at the gates of transistors M6-M9 drops to a level that turns on transistors M6 and M7 and turns off transistors M8 and M9 thereby forcing the signal at output 1002b to be pulled to a logic high level through transistors M6 and M7.

When the signal to input 1002b has a falling edge, transistor M2 turns on and transistor M3 turns off. With transistor M2 on, capacitor C1 begins to charge through transistor M2. The voltage across capacitor C1 ramps up at a rate that is a function of the Vgs of transistor M2 and the capacitance of capacitor C1. Eventually, the voltage at the gates of transistors M6-M9 rises to a level that turns on transistors M8 and M9 and turns off transistors M6 and M7 thereby forcing the signal at output 1002b to be pulled to a logic low level through transistors M8 and M9.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input or control terminal and its (current) terminals. In the context of a FET, the control input is the gate, and the current terminals are the drain and source. In the context of a BJT, the control input is the base, and the current terminals are the collector and emitter.

References herein to a FET being "ON" or "enabled" means that the conduction channel of the FET is present and drain current may flow through the FET. References herein to a FET being "OFF" or "disabled" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other examples, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described examples, and other examples are possible, within the scope of the claims.

What is claimed is:

1. An apparatus, comprising:
a transmitter having an input, an output, and a first supply voltage terminal, the input coupled to an input of the transmitter terminal of the apparatus;
a voltage regulator having an input, an output, and a control input, the input of the voltage regulator coupled to a second supply voltage terminal, and the output of the voltage regulator coupled to the first supply voltage terminal;
an isolator having first and second terminals, the first terminal of the isolator coupled to the output of the transmitter; and
a test controller having a first test controller terminal, a second test controller terminal, a first control output, the first test controller terminal coupled to the second supply voltage terminal, the second test controller terminal coupled to the input terminal of the apparatus, the first control output coupled to the control input of the voltage regulator, the test controller configured to change a logic state of a control signal at the first control output from a first logic state to a second logic state.

2. The apparatus of claim 1, wherein the voltage regulator is configured to reduce its output voltage in response to the change in the logic state of the control signal at the first control output of the test controller.

3. The apparatus of claim 1, wherein the test controller is configured to determine that a period of time has elapsed from the change of the logic state of the control signal from the first logic state to the second logic state and change the logic state of the control signal from the second logic state to the first logic state.

4. The apparatus of claim 1, further comprising:
a receiver having an input and an output, the input of the receiver coupled to the second terminal of the isolator; and
a glitch detection circuit having an input and a control input, the input of the glitch detection circuit coupled to the output of the receiver;
wherein:
the isolator has a third terminal and a fourth terminal;
the test controller has a second control output coupled to the third terminal; and
the control input of the glitch detection circuit is coupled to the fourth terminal.

5. The apparatus of claim 4, wherein the test controller is configured to enable the glitch detection circuit.

6. The apparatus of claim 4, wherein the control signal is a first control signal, the test controller is configured to:
determine that a sequencing of a voltage at the first test controller terminal and a bit pattern of data at the second test controller terminal matches a test sequencing of the voltage and a test bit pattern of the data;
change the logic state of the first control signal from the first logic state to the second logic state; and
change a logic state of a second control signal at the second control output.

7. The apparatus of claim 4, wherein the glitch detection circuit is configured to generate a signal pulse in response to an edge of an input signal at the input of the glitch detection circuit and to determine that the input signal changes logic state during the signal pulse.

8. The apparatus of claim 7, wherein the glitch detection circuit is configured to force an output signal from an output terminal of the apparatus to a static logic state in response to determining that the input signal changes logic state during the signal pulse.

9. The apparatus of claim 4, wherein the glitch detection circuit comprises:
a rising edge detection circuit having an input and an output, the input of the rising edge detection circuit coupled to the input of the glitch detection circuit;
a falling edge detection circuit having an input and an output, the input of the falling edge detection circuit coupled to the input of the glitch detection circuit; and
a logic gate having a first logic gate input and a second logic gate input, the first logic gate input coupled to the output of the rising edge detection circuit, and the second logic gate input coupled to the output of the falling edge detection circuit.

10. The apparatus of claim 9, wherein:
the rising edge detection circuit is configured to generate a first signal pulse in response to a rising edge of an input signal at the input of the glitch detection circuit and determine that the input signal changes logic state during the first signal pulse; and
the falling edge detection circuit is configured to generate a second signal pulse in response to a falling edge of the input signal at the input of the glitch detection circuit and determine that the input signal changes logic state during the second signal pulse.

11. The apparatus of claim 4, wherein the glitch detection circuit comprises:
a first flip-flop having a clock input coupled to the input of the glitch detection circuit, the first flip-flop also having a data input and an output;
a first delayed clear circuit having an input and an output, the input of the first delayed clear circuit coupled to the output of the first flip-flop, and the output of the first delayed clear circuit coupled to the data input of the first flip-flop;
an inverter having an input coupled to the input of the glitch detection circuit, the inverter having an output;
a second flip-flop having a clock input coupled to the output of the inverter, the second flip-flop having a data input and an output; and
a second delayed clear circuit having an input and an output, the input of the second delayed clear circuit coupled to the output of the second flip-flop, and the output of the second delayed clear circuit coupled to the data input of the second flip-flop.

12. An apparatus, comprising:
an isolator having a first terminal and a second terminal;
a receiver having an input and an output, the input of the receiver coupled to the first terminal of the isolator;
a buffer having an input coupled to the output of the receiver; and
a glitch detection circuit having an input coupled to the output of the receiver.

13. The apparatus of claim 12, wherein the glitch detection circuit is configured to generate a signal pulse in response to an edge of an input signal at the input of the glitch detection circuit and to determine that the input signal changes logic state during the signal pulse.

14. The apparatus of claim 13, wherein the buffer has an output, and the glitch detection circuit is configured to force an output signal from the output of the buffer to a static logic state in response to determining that the input signal changes logic state during the signal pulse.

15. The apparatus of claim 12, wherein the glitch detection circuit comprises:
a rising edge detection circuit configured to generate a first signal pulse in response to a rising edge of an input signal at the input of the glitch detection circuit and determine that the input signal changes logic state during the first signal pulse; and
a falling edge detection circuit configured to generate a second signal pulse in response to a falling edge of the input signal at the input of the glitch detection circuit and determine that the input signal changes logic state during the second signal pulse.

16. The apparatus of claim 15, wherein:
the rising edge detection circuit includes a first monoshot circuit and a first error bit detection circuit, the first monoshot circuit having a first input, a second input, and an output, the first input of the first monoshot circuit coupled to the input of the glitch detection circuit, the first error bit detection circuit having an input coupled to the output of the first monoshot circuit; and
the falling edge detection circuit includes a second monoshot circuit and a second error bit detection circuit, the second monoshot circuit having a first input, a second input, and an output, the first input of the second monoshot circuit coupled to the input of the glitch detection circuit, the second error bit detection circuit having an input coupled to the output of the second monoshot circuit, the output of the second monoshot circuit coupled to the second input of the first monoshot circuit, and the second input of the second monoshot circuit coupled to the output of the first monoshot circuit.

17. The apparatus of claim 12, further comprising:
a transmitter having an input and a first supply voltage terminal;
a voltage regulator having an input, an output, and a control input, the input of the voltage regulator coupled to a second supply voltage terminal, and the output of the voltage regulator coupled to the first supply voltage terminal; and
a test controller having a first test controller terminal, a second test controller terminal, and a first control output, the first test controller terminal coupled to the second supply voltage terminal, the second test controller terminal coupled to the input of the transmitter, the first control output coupled to the control input of the voltage regulator.

18. The apparatus of claim 17, wherein the test controller has a second control output, the glitch detection circuit has a control input, and the second control output is coupled to the control input of the glitch detection circuit.

19. The apparatus of claim 18, wherein the test controller configured to:
determine that a sequencing of a voltage at the first test controller terminal and a bit pattern of data at the second test controller terminal matches a test sequencing of the voltage and a test bit pattern of the data; and
sequentially change a logic state of a control signal at the first control output between first and second logic states and change a logic state of a control signal at the second control output between the first and second logic states.

20. An apparatus, comprising:
a voltage regulator having input voltage, an output voltage terminal, and a control input;
a transmitter having an input, an output, and an input voltage terminal, the input voltage terminal coupled to the output voltage terminal of the voltage regulator;
an isolator having a first terminal, a second terminal, a third terminal, and a fourth terminal, the first terminal of the isolator coupled to the output of the transmitter;
a receiver having an input and an output, the input of the receiver coupled to the second terminal of the isolator;
a glitch detection circuit having an input and a control input, the input of the glitch detection circuit coupled to the output of the receiver, and the control input of the glitch detection circuit coupled to the fourth terminal of the isolator; and
a test controller having a first test controller terminal and a second test controller terminal, the first test controller terminal coupled to the control input of the voltage regulator, and the second test controller terminal coupled to the third terminal of the isolator.

21. The apparatus of claim 20, wherein the test controller is configured to:
change a logic state of a first control signal at the first test controller terminal to cause the voltage regulator to reduce its output voltage; and
change a logic state of a second control signal at the second test controller terminal to enable the glitch detection circuit.

* * * * *